US012758933B2

(12) United States Patent
Kanamaru et al.

(10) Patent No.: US 12,758,933 B2
(45) Date of Patent: Oct. 13, 2026

(54) PRESSURE SENSOR MODULE AND DISPENSING DEVICE INCLUDING PRESSURE SENSOR MODULE

(71) Applicant: Hitachi High-Tech Corporation, Tokyo (JP)

(72) Inventors: Masatoshi Kanamaru, Tokyo (JP); Tatsuya Yamasaki, Tokyo (JP); Yoichiro Suzuki, Tokyo (JP); Takuya Takahashi, Tokyo (JP); Takanori Aono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 346 days.

(21) Appl. No.: 18/701,645

(22) PCT Filed: Oct. 14, 2022

(86) PCT No.: PCT/JP2022/038290
§ 371 (c)(1),
(2) Date: Apr. 16, 2024

(87) PCT Pub. No.: WO2023/100493
PCT Pub. Date: Jun. 8, 2023

(65) Prior Publication Data

US 2024/0408560 A1 Dec. 12, 2024

(30) Foreign Application Priority Data

Dec. 2, 2021 (JP) ................................ 2021-196152

(51) Int. Cl.
*B01J 4/00* (2006.01)
*G01L 9/00* (2006.01)
*G01L 19/00* (2006.01)

(52) U.S. Cl.
CPC ............ *B01J 4/008* (2013.01); *G01L 9/0054* (2013.01); *G01L 19/0023* (2013.01)

(58) Field of Classification Search
CPC .... B01J 4/008; B01J 4/002; B01J 4/02; G01L 9/0054; G01L 19/0023; G01L 19/003;
(Continued)

(56) References Cited

U.S. PATENT DOCUMENTS 5,889,211 A * 3/1999 Maudie .............. G01L 19/0627 73/706
2012/0247218 A1* 10/2012 Crivelli ................ G01L 9/0073 73/724
2018/0120186 A1 5/2018 Imai et al.

FOREIGN PATENT DOCUMENTS

EP 2505981 A1 10/2012
JP 57-136132 A 8/1982
(Continued)

OTHER PUBLICATIONS

International Search Report of PCT/JP2022/038290 dated Dec. 20, 2022.

*Primary Examiner* — Tarun Sinha
(74) *Attorney, Agent, or Firm* — MATTINGLY & MALUR, PC

(57) ABSTRACT

A pressure sensor module according to the invention includes, inside a flow channel substrate, a flow channel configured to allow system water to flow therethrough and a branch channel connected to the flow channel, in which a semiconductor element on which a strain detection unit is mounted is joined to the flow channel substrate via a joining layer at an outlet portion of the branch channel so as to close the outlet portion of the branch channel. A moisture prevention film is provided so as to cover a surface of the flow channel substrate in the branch channel, a surface of the joining layer in the branch channel, and a surface of the
(Continued)

semiconductor element on a side where the strain detection unit is not mounted.

9 Claims, 9 Drawing Sheets

(58) Field of Classification Search
CPC ............ G01L 19/0038; G01L 19/0654; G01L 19/147; G01L 9/0051
See application file for complete search history.

(56) References Cited

FOREIGN PATENT DOCUMENTS

| | | | |
|---|---|---|---|
| JP | 08-278218 | A | 10/1996 |
| JP | 2005-207898 | A | 8/2005 |
| JP | 2018-072106 | A | 5/2018 |
| JP | 2018-115944 | A | 7/2018 |

* cited by examiner

[FIG. 1]
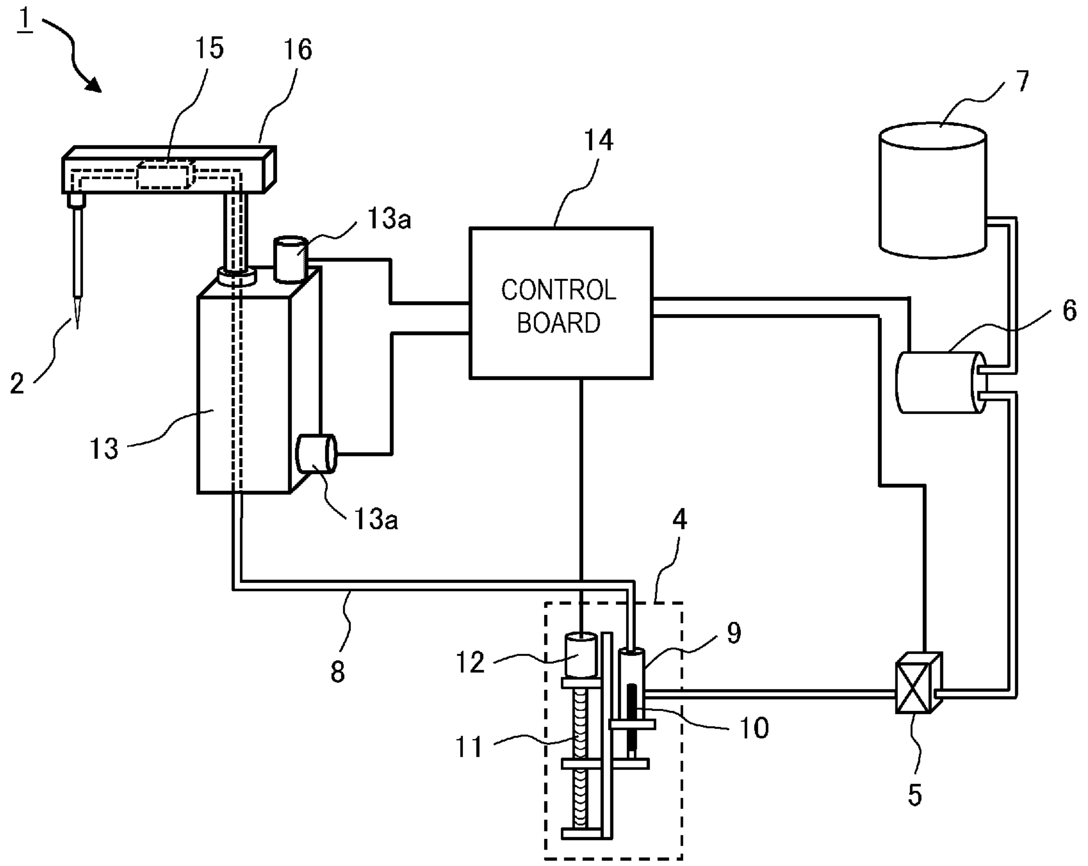
[FIG. 2]
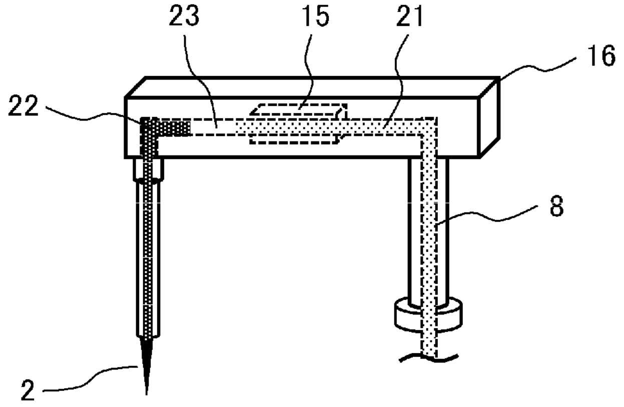

[FIG. 3A]
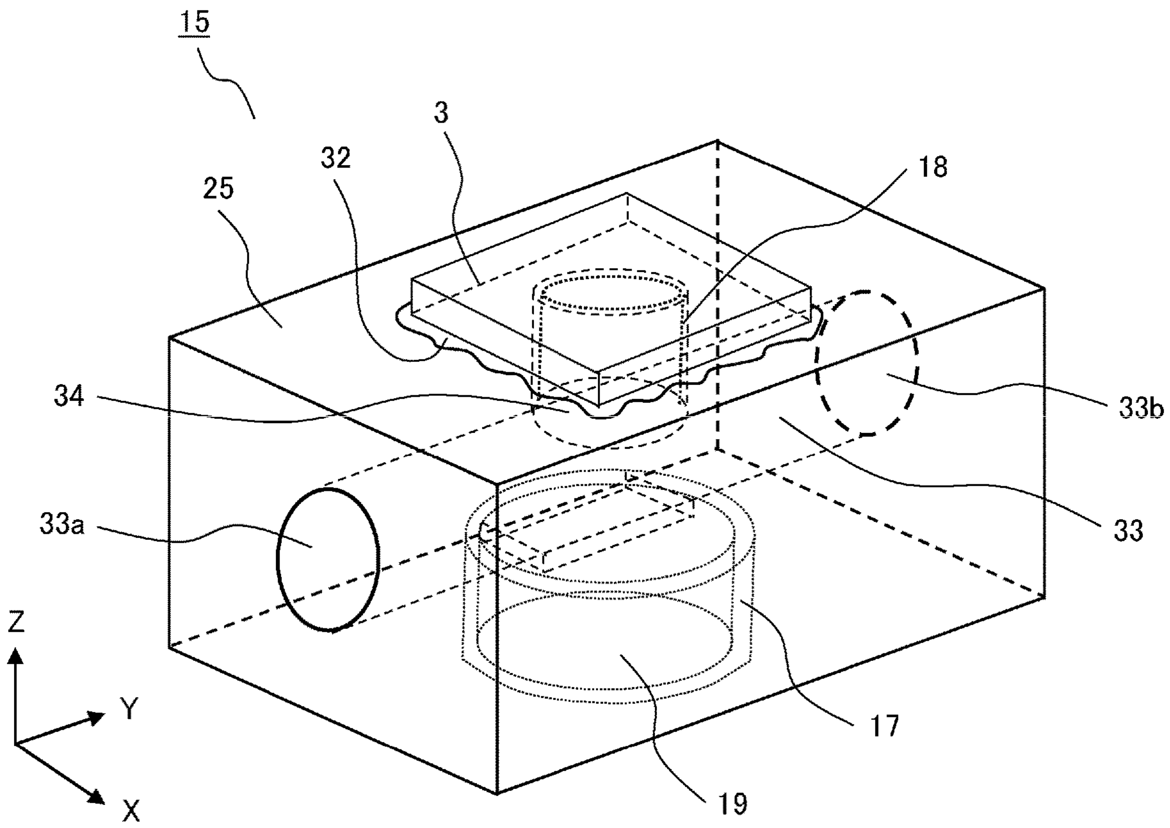
[FIG. 3B]
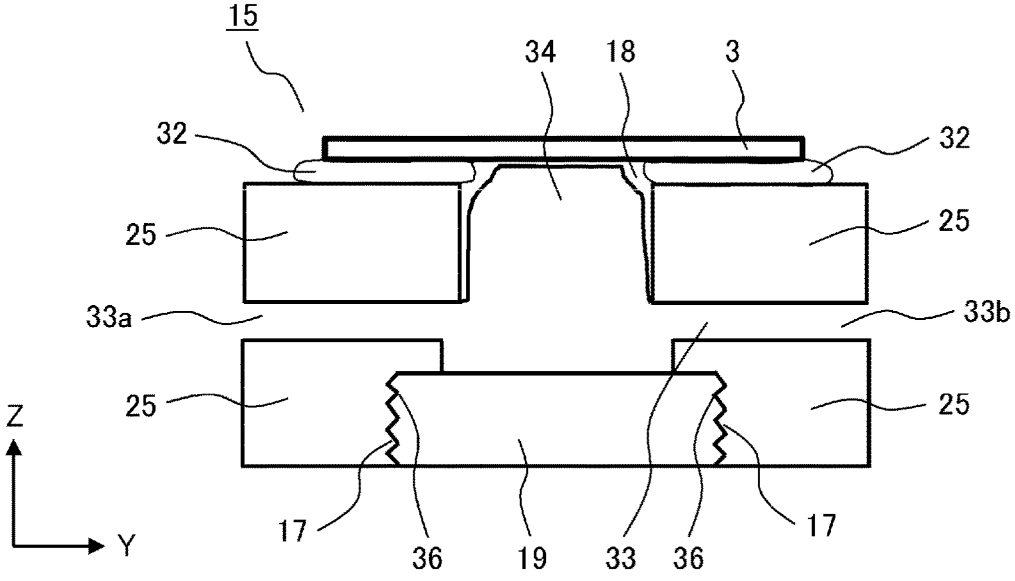

[FIG. 4]
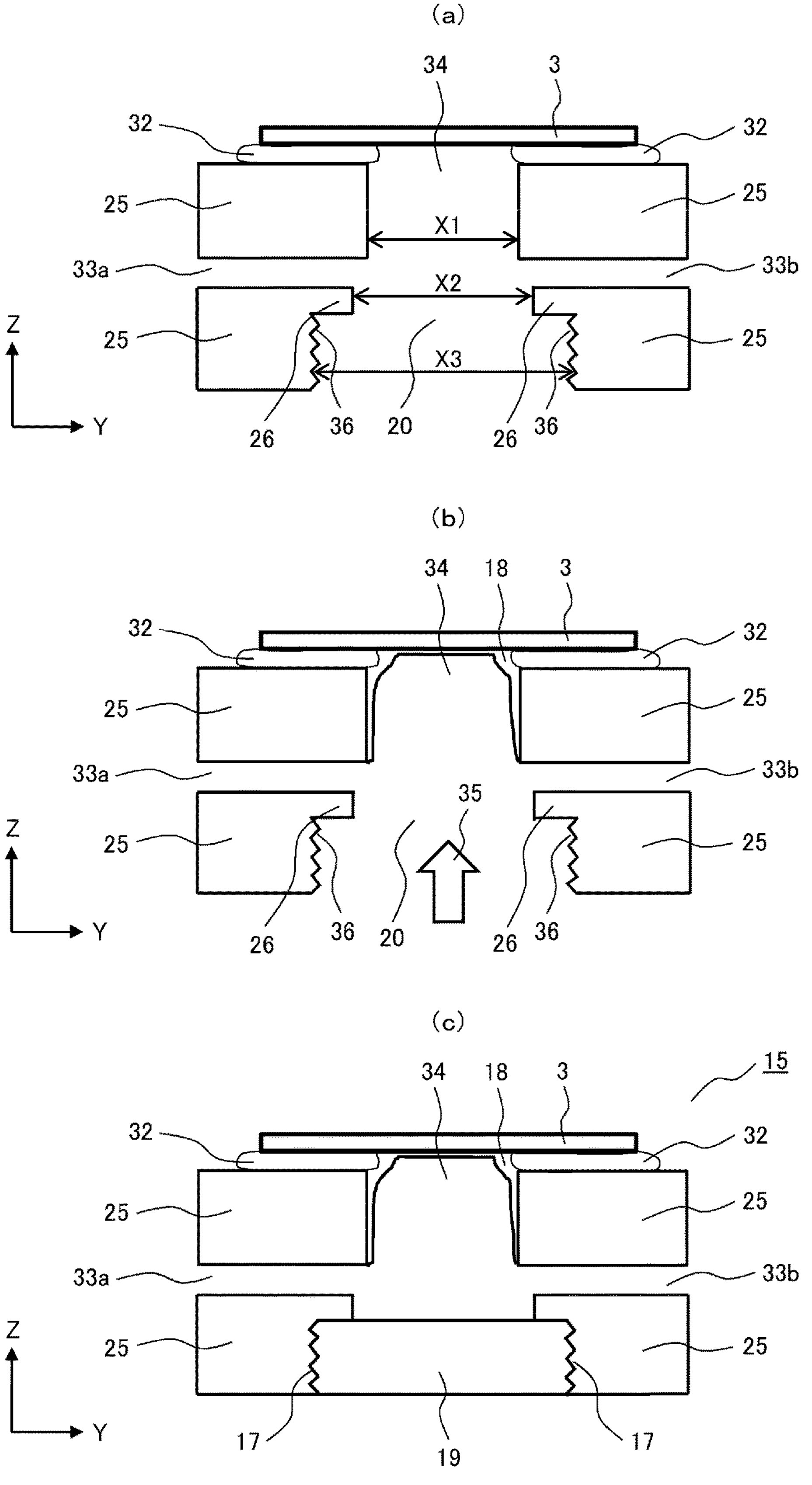

[FIG. 5]
(a)
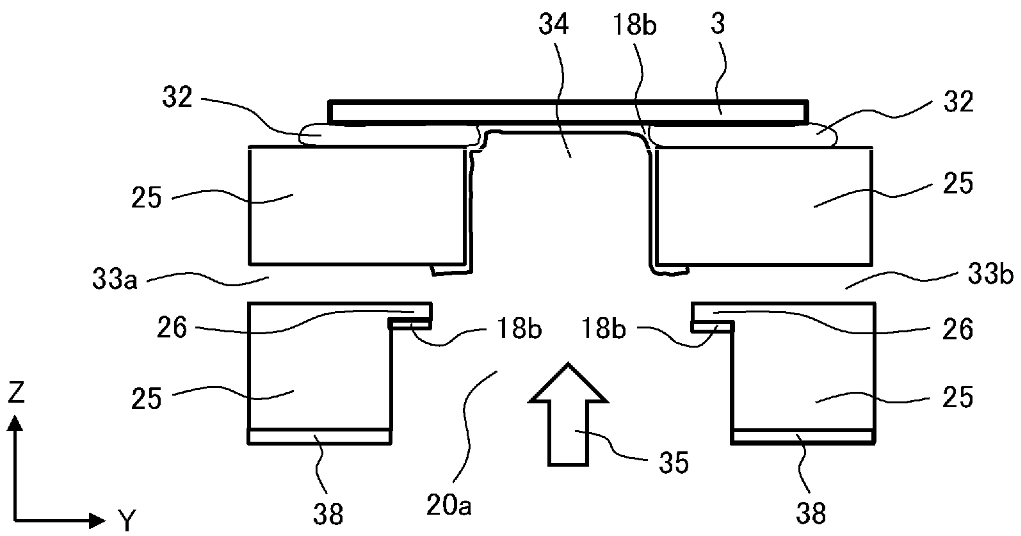
(b)
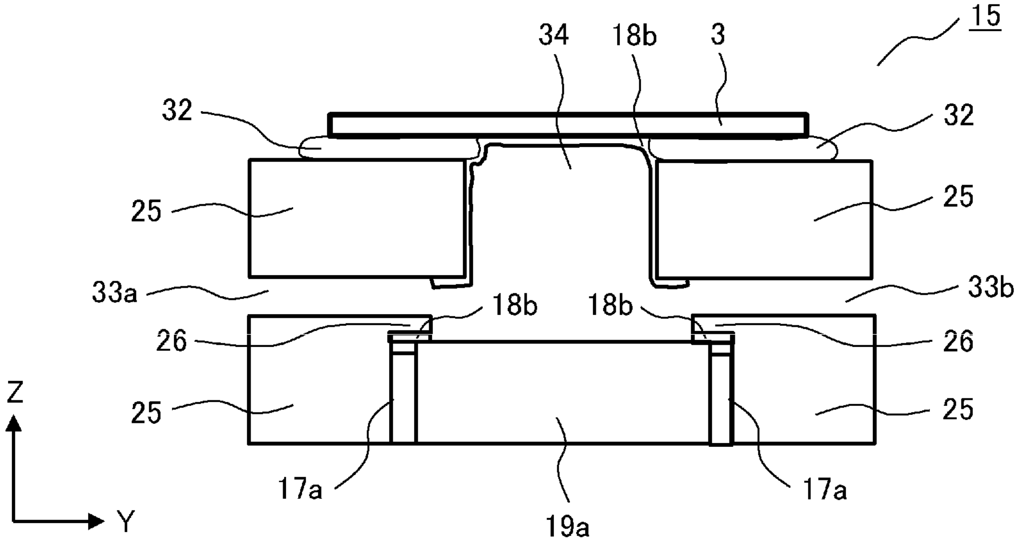

[FIG. 6A]
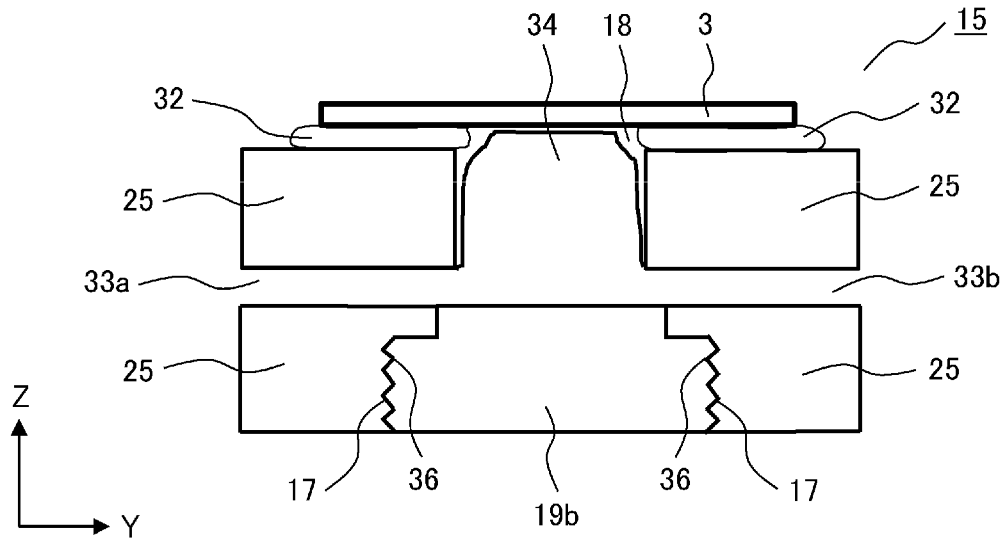
[FIG. 6B]
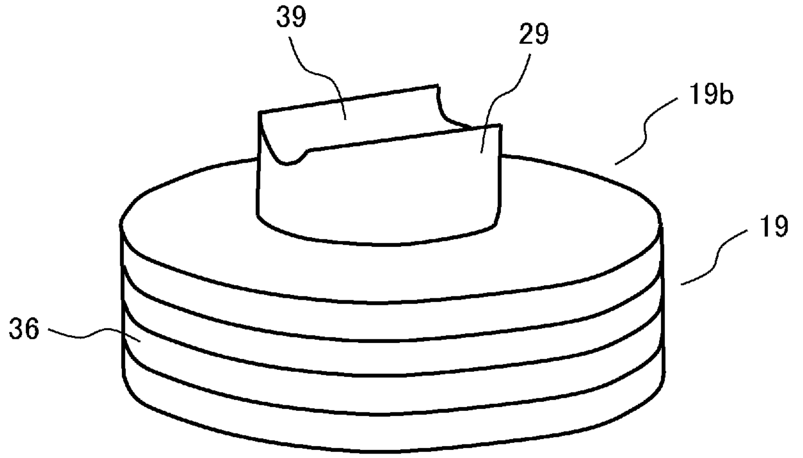

[FIG. 7]
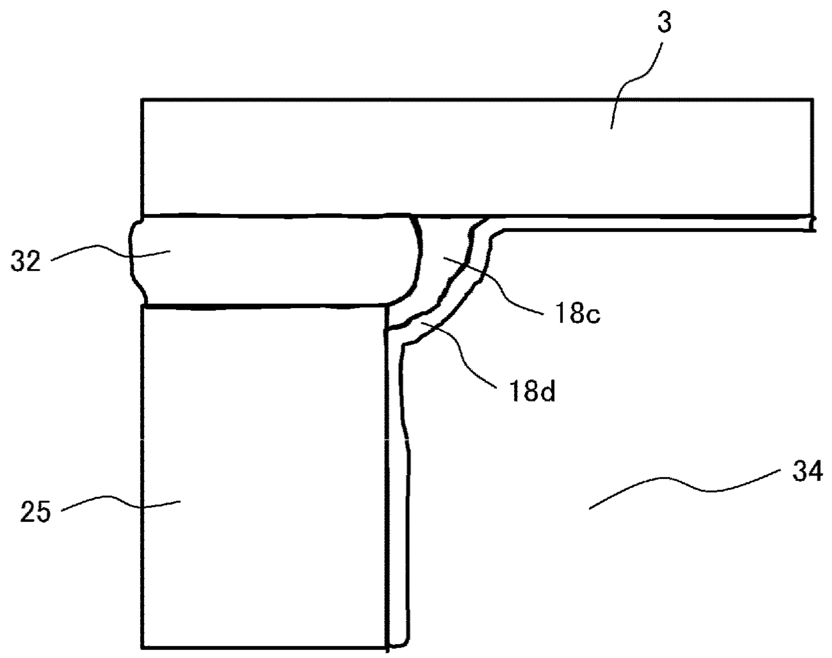
[FIG. 8]
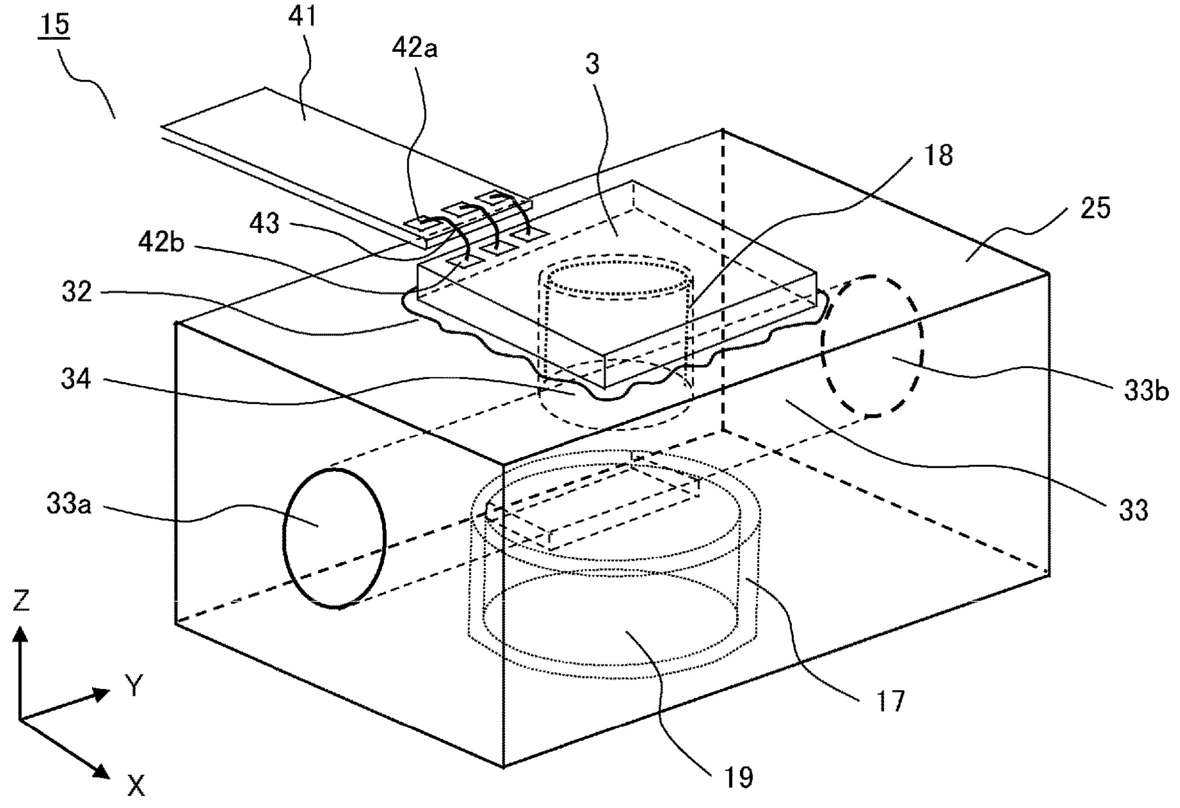

[FIG. 9]
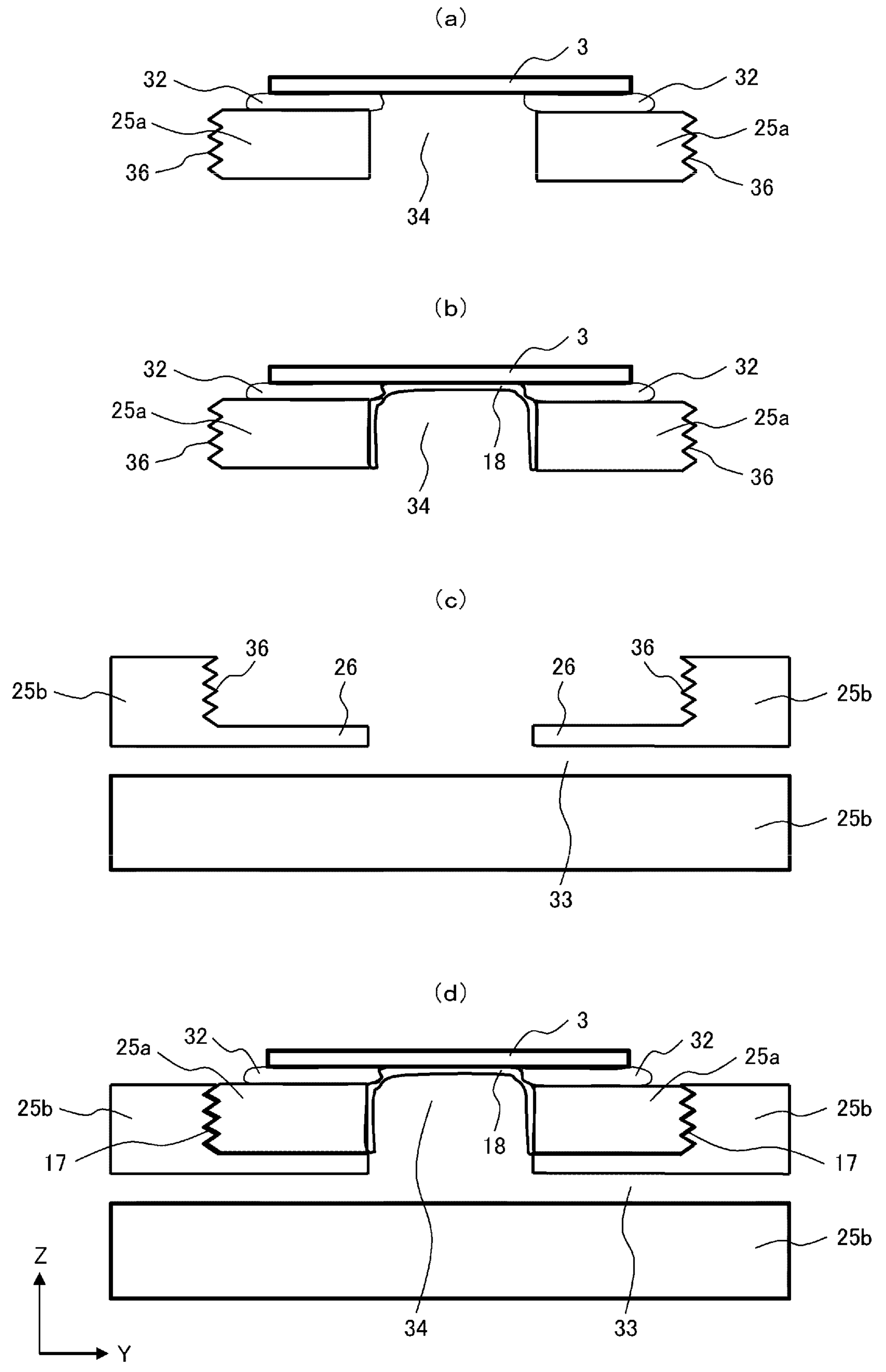

[FIG. 10]
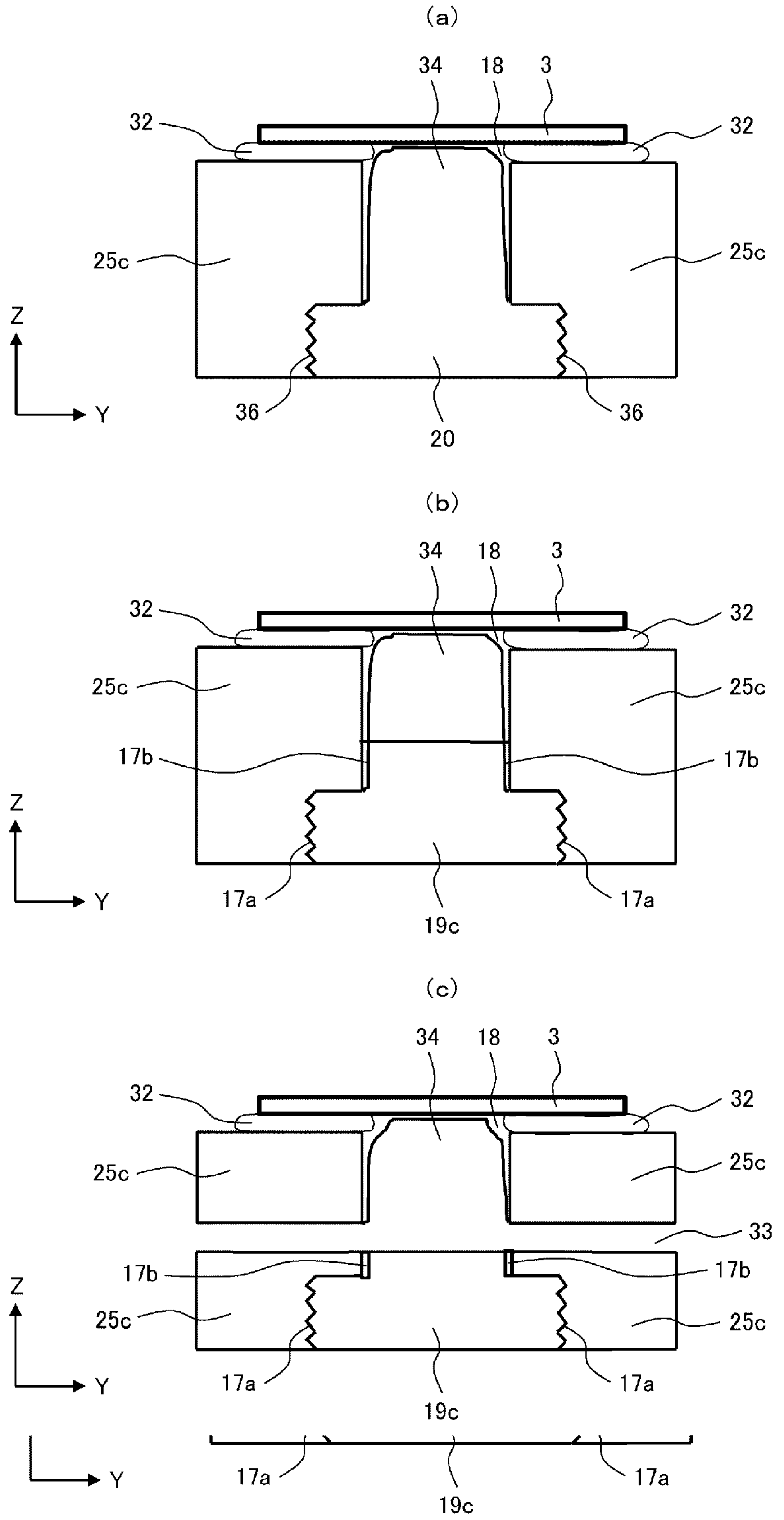

[FIG. 11]
(a)
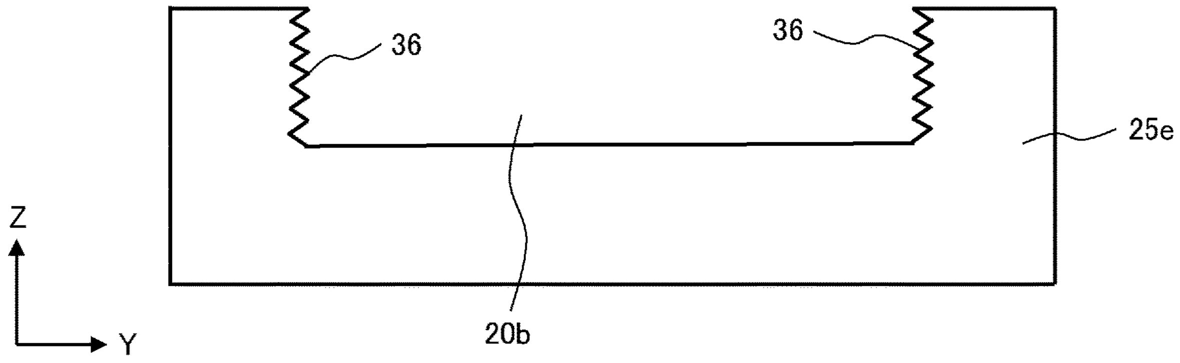
(b)
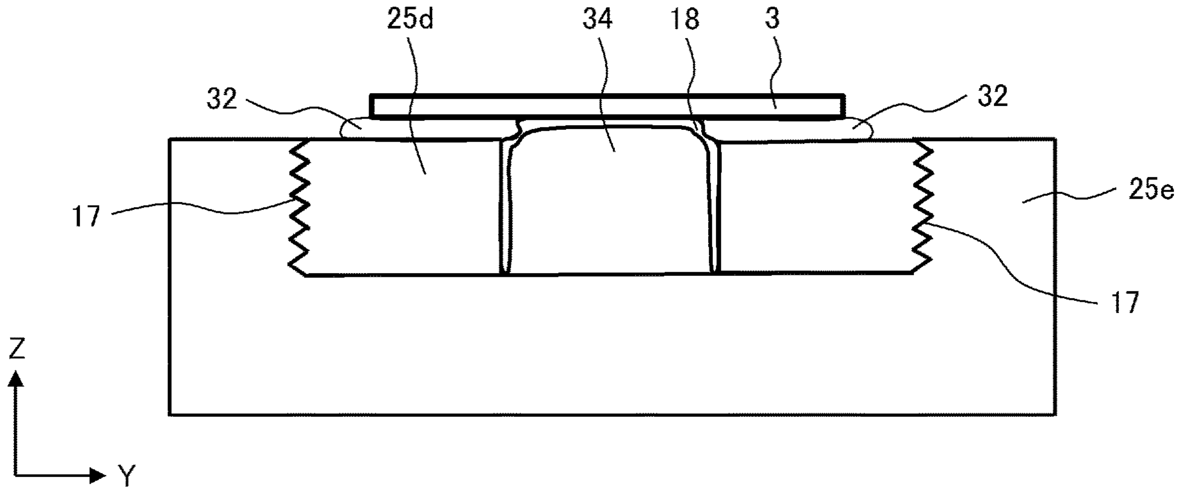
(c)
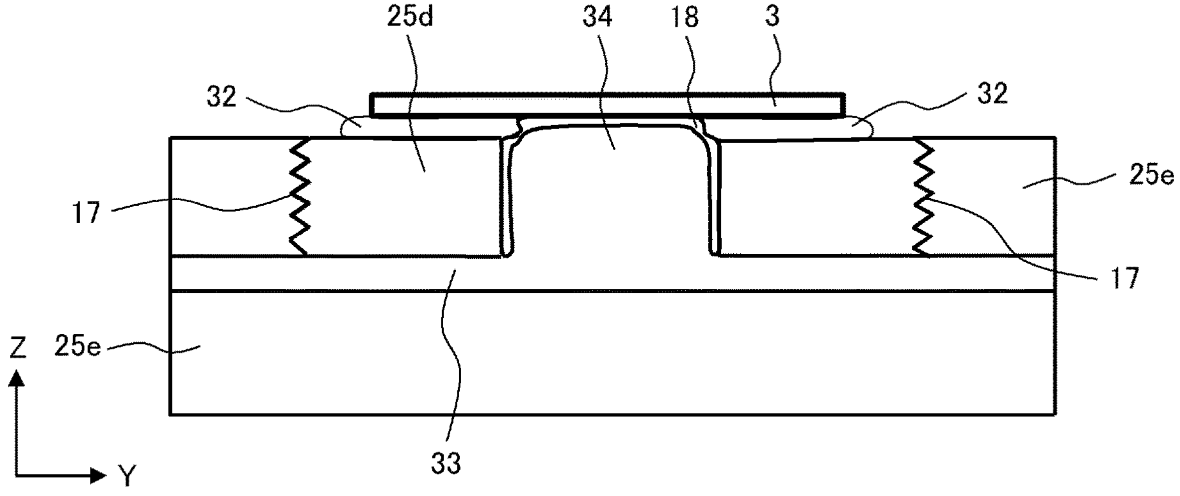

PRESSURE SENSOR MODULE AND DISPENSING DEVICE INCLUDING PRESSURE SENSOR MODULE

TECHNICAL FIELD

The present invention relates to a pressure sensor module and a dispensing device including the pressure sensor module, and particularly to a pressure sensor module using a piezoresistive semiconductor element and a dispensing device including the pressure sensor module.

BACKGROUND ART

In a general pressure sensor, a pressure detection element is formed (adhered) on a diaphragm made of a non-conductive material such as a silicon material or a ceramic material, and the diaphragm is deformed by an external pressure of a liquid or a gas. Then, the pressure sensor electrically measures a change amount of the diaphragm as a change in a resistance value using a Wheatstone bridge circuit or the like, converts the change in the resistance value into a change in a pressure value, and measures an external pressure.

In particular, the diaphragm formed on a part of a semiconductor substrate is formed by thinning a back surface of the semiconductor substrate on which a pressure detection element is formed by anisotropic-etching or dry-etching silicon.

By etching a part of the semiconductor substrate, a certain measurement area is ensured, and the back surface of the semiconductor substrate on which the pressure detection element is formed is processed to be thin to any thickness. In this way, by thinning a part of the semiconductor substrate and forming the diaphragm, the diaphragm is easily deformed when the external pressure is applied.

As the related art in such a technical field, there are, for example, PTL 1 and PTL 2.

PTL 1 discloses a pressure sensor in which a sensor chip is formed by a first semiconductor substrate and a second semiconductor substrate, a strain gauge and a temperature sensor for temperature detection are formed on one surface of the first semiconductor substrate, the sensor chip is accommodated in a package in a state in which these are covered with a corrosion-resistant protective film and the protective film is exposed as a liquid-contacting portion, a rapid temperature change due to a high-temperature fluid to be measured is detected as a thermal shock based on a temperature of the fluid to be measured that is measured by the temperature sensor, and an output is corrected (see an abstract).

PTL 2 describes a pressure detection device including a pressure sensor having a pressure detection surface that measures a pressure of a fluid, and a flow channel unit in which a flow channel that introduces the fluid into the pressure detection surface is formed, in which the flow channel unit includes a flow channel body in which the flow channel is formed and a ground ring installed in contact with the pressure sensor, and the ground ring is formed of a conductive fluororesin material containing a fluororesin material and a conductive material dispersed in the fluororesin material, and is maintained at a ground potential (see an abstract).

CITATION LIST

Patent Literature

PTL 1: JP2018-115944A
PTL 2: JP2018-072106A

SUMMARY OF INVENTION

Technical Problem

PTL 1 discloses a pressure sensor in which a silicon material is used for a diaphragm. PTL 2 discloses the pressure detection device in which sapphire or ceramics are used for a diaphragm.

However, PTL 1 does not disclose that a strength of a joining layer that joins the package to the sensor chip is maintained to ensure reliability of the pressure sensor. PTL 2 does not disclose that a strength of a joining layer that joins the flow channel body to the pressure sensor is maintained to ensure reliability of the pressure detection device.

In view of the above, the invention provides a highly reliable pressure sensor module that maintains a strength of a joining layer that joins a flow channel substrate to a semiconductor element on which a strain detection unit is mounted, and a dispensing device on which the pressure sensor module is mounted.

Solution to Problem

In order to solve the above-described problem, a pressure sensor module according to the invention is a pressure sensor module including: inside a flow channel substrate, a flow channel configured to allow system water to flow therethrough; and a branch channel connected to the flow channel, in which a semiconductor element on which a strain detection unit is mounted is joined to the flow channel substrate via a joining layer at an outlet portion of the branch channel so as to close the outlet portion of the branch channel. A moisture prevention film is provided to cover a surface of the flow channel substrate in the branch channel, a surface of the joining layer in the branch channel, and a surface of the semiconductor element on a side where the strain detection unit is not mounted.

A dispensing device according to the invention includes the above-described pressure sensor module.

Advantageous Effects of Invention

According to the invention, it is possible to provide a highly reliable pressure sensor module that maintains a strength of a joining layer that joins a flow channel substrate to a semiconductor element on which a strain detection unit is mounted, and a dispensing device on which the pressure sensor module is mounted.

Problems, configurations, and effects other than those described above will be clarified by description of the following embodiments.

BRIEF DESCRIPTION OF DRAWINGS

FIG. 1 is an explanatory view showing a basic configuration of a dispensing device 1 according to Embodiment 1.

FIG. 2 is an explanatory view showing an internal state of a pipe 8 in a dispensing arm 16 according to Embodiment 1.

FIG. 3A is a perspective view showing a pressure sensor module 15 according to Embodiment 1.

FIG. 3B is a cross-sectional view showing the pressure sensor module 15 according to Embodiment 1.

FIG. 4 shows cross-sectional views showing steps (a), (b), and (c) of a manufacturing process for forming a moisture prevention film 18 of the pressure sensor module 15 according to Embodiment 1.

FIG. 5 shows cross-sectional views showing steps (a) and (b) of a manufacturing process for forming the moisture prevention film 18 (inorganic film material) of the pressure sensor module 15 according to Embodiment 1.

FIG. 6A is a cross-sectional view showing another pressure sensor module 15 according to Embodiment 1.

FIG. 6B is a perspective view showing a sealing member 19*b* of another pressure sensor module 15 according to Embodiment 1.

FIG. 7 is an enlarged cross-sectional view showing a composite film as the moisture prevention film 18 of the pressure sensor module 15 according to Embodiment 1.

FIG. 8 is a perspective view showing the pressure sensor module 15 including a flexible substrate 41 according to Embodiment 1.

FIG. 9 shows cross-sectional views showing steps (a), (b), (c), and (d) of a manufacturing process of the pressure sensor module 15 according to Embodiment 2.

FIG. 10 shows cross-sectional views showing steps (a), (b), and (c) of a manufacturing process of the pressure sensor module 15 according to Embodiment 3.

FIG. 11 shows cross-sectional views showing steps (a), (b), and (c) of a manufacturing process of the pressure sensor module 15 according to Embodiment 4.

DESCRIPTION OF EMBODIMENTS

Hereinafter, embodiments of the invention will be described with reference to the drawings. In the drawings, substantially the same or similar components may be denoted by the same reference numerals. In the drawings, when description of a configuration is redundant, the redundant description may be omitted.

Embodiment 1

First, a basic configuration of a dispensing device 1 according to Embodiment 1 will be described.

FIG. 1 is an explanatory view showing a basic configuration of the dispensing device 1 according to Embodiment 1.

The dispensing device 1 includes a nozzle 2 that aspirates or ejects a liquid (fluid to be measured) 22 such as a sample, a syringe pump 4 that adjusts aspiration or ejection of the liquid 22, a pipe 8 that connects the nozzle 2 to the syringe pump 4, a solenoid valve 5, a gear pump 6, and a tank 7 that stores system water 21.

The syringe pump 4 includes a container 9 to which the system water 21 is supplied, a plunger 10 that pushes the system water 21 out from the container 9 or draws the system water 21 into the container 9, a ball screw 11 that moves the plunger 10, and a motor 12 that drives the ball screw 11.

The pipe 8 connects the container 9 to the nozzle 2, and the nozzle 2 aspirates or ejects the liquid 22 using the system water 21 flowing through the pipe 8.

The dispensing device 1 also includes a control board 14 that controls the solenoid valve 5, the gear pump 6, the motor 12, and two motors 13*a* installed in a dispensing mechanism 13. That is, the aspiration or ejection of the liquid 22 by the nozzle 2 is controlled by the control board 14.

The dispensing device 1 further includes a dispensing arm 16 that moves the nozzle 2 to a position where the nozzle 2 aspirates or ejects the liquid 22. The nozzle 2 is installed at one end of the dispensing arm 16, and the dispensing mechanism 13 is installed at the other end of the dispensing arm 16. In order to move the nozzle 2, the dispensing arm 16 can be rotated and vertically moved by the two motors 13*a* installed in the dispensing mechanism 13.

The dispensing arm 16 includes a pressure sensor module 15 therein.

Next, an internal state of the pipe 8 in the dispensing arm 16 according to Embodiment 1 will be described.

FIG. 2 is an explanatory view showing the internal state of the pipe 8 in the dispensing arm 16 according to Embodiment 1. FIG. 2 shows the internal state of the pipe 8 immediately after aspiration of the liquid 22 or immediately before ejection of the liquid 22.

The pipe 8 is filled therein with the system water 21 for syringe pressure transmission. The liquid 22 can be aspirated or ejected by the nozzle 2 by transmitting a syringe pressure via the system water 21 using the syringe pump 4.

When sucking the liquid 22 by the nozzle 2, the plunger 10 is drawn into the container 9 with the solenoid valve 5 closed. On the other hand, when ejecting the liquid 22 from the nozzle 2, the plunger 10 is pushed out from the container 9 with the solenoid valve 5 closed.

When sucking the liquid 22, the liquid 22 is aspirated after dividing air 23 for dividing the liquid 22 from the system water 21 is aspirated by the nozzle 2 such that the liquid 22 is not mixed with the system water 21 inside the pipe 8.

After the liquid 22 is ejected from the nozzle 2, the nozzle 2 is cleaned. When cleaning the nozzle 2, the system water 21 is pushed out from the nozzle 2 simultaneously with a flow of cleaning water onto an outer wall of the nozzle 2. When the system water 21 is pushed out from the nozzle 2 at the time of cleaning the nozzle 2, the system water 21 is pushed out from the nozzle 2 using a pressure of the gear pump 6 with the solenoid valve 5 opened. That is, the solenoid valve 5 and the gear pump 6 are used when cleaning the nozzle 2. When cleaning the nozzle 2, the system water 21 is pushed out at a higher pressure than when the system water 21 is pushed out by the plunger 10.

The pressure sensor module 15 installed inside the dispensing arm 16 and installed in communication with the pipe 8 installed inside the dispensing arm 16 detects, with high accuracy, an abnormality such as clogging or empty aspiration of the nozzle 2 that may occur during a dispensing operation. The pressure sensor module 15 monitors a pressure change in the system water 21, and detects, with high accuracy, the pressure change in the system water 21, which occurs during the abnormality such as clogging or empty aspiration of the nozzle 2.

In Embodiment 1, in order to sensitively detect, with high accuracy, an abnormality in the nozzle 2, that is, a pressure change in the system water 21 due to the abnormality in the nozzle 2, the pressure sensor module 15 is installed inside the dispensing arm 16 installed at a position closest to the nozzle 2. However, an installation position of the pressure sensor module 15 is not limited to inside the dispensing arm 16. For example, the pressure sensor module 15 may be installed in communication with the pipe 8 installed inside the dispensing mechanism 13.

Next, the pressure sensor module 15 according to Embodiment 1 will be described.

FIG. 3A is a perspective view showing the pressure sensor module 15 according to Embodiment 1, and FIG. 3B is a cross-sectional view showing the pressure sensor module 15 according to Embodiment 1.

Here, for convenience of description, in the pressure sensor module 15, a long side direction (a direction in which the pipe 8 is formed and a direction in which a flow channel 33 is formed) is a Y direction, a short side direction is an X direction, and a height direction is a Z direction.

The pressure sensor module 15 includes a flow channel substrate 25 in which a cylindrical (circular in a cross-sectional shape in a vertical direction) flow channel 33 through which the system water 21 flows is formed. The flow channel substrate 25 is preferably made of stainless steel, and may be made of a metal material such as aluminum or titanium or may be made of a resin material such as acrylic as long as the material has high corrosion resistance.

A flow channel inlet 33*a* (for example, on a nozzle 2 side) and a flow channel outlet 33*b* (for example, on a dispensing mechanism 13 side) are formed in the flow channel 33, and a screw portion (not shown) is formed in each of the flow channel inlet 33*a* and the flow channel outlet 33*b*. The flow channel inlet 33*a* and the flow channel outlet 33*b* are connected to the pipe 8 via joints (not shown) connected to the screw portions, respectively.

A cylindrical (cylindrical shape with a diameter equal to or larger than a diameter of the flow channel 33) branch channel 34 connected to the flow channel 33 and branched toward an outer surface of the flow channel substrate 25 (Z direction: upper direction in Embodiment 1) is formed inside the flow channel substrate 25. A cross-sectional shape of the branch channel 34 in a horizontal direction is preferably circular, and may be elliptical.

A piezoresistive semiconductor element 3 is installed at a terminal end portion (upper end portion in Embodiment 1) of the branch channel 34 so as to close the branch channel 34. The piezoresistive semiconductor element 3 is joined (may be referred to as adhered, mounted, or installed) to the flow channel substrate 25 via a joining layer 32 that joins the piezoresistive semiconductor element 3 to the flow channel substrate 25. A strain gauge, a piezoelectric element, or the like may be used instead of the piezoresistive semiconductor element 3.

Here, the piezoresistive semiconductor element 3 is a thin film semiconductor element having a diaphragm that is deformed by a minute pressure change, formed on the diaphragm, and equipped with a strain detection unit (so-called piezoresistive semiconductor element, and may be referred to as a pressure detection element or pressure sensing unit) that detects the minute pressure change.

That is, the pressure sensor module 15 includes, inside the flow channel substrate 25, the cylindrical flow channel 33 through which the system water 21 flows and that is formed in the horizontal direction, and the cylindrical branch channel 34 connected to the flow channel 33 (branched from the flow channel 33 in the upper direction that is the vertical direction), and joins the piezoresistive semiconductor element 3 to the flow channel substrate 25 at an outlet portion (terminal end portion) of the branch channel 34 via the joining layer 32 so as to close the outlet portion of the branch channel 34.

An adhesive material such as a silver paste (adhesive), a silicon-based adhesive, an epoxy-based adhesive, a thermal diffusion bonding agent (adhesive), a thermosetting adhesive, a UV addition adhesive, or a low-melting-point glass (adhesive) is used for the joining layer 32. A thickness of the joining layer 32 is preferably 10 μm to 70 μm, particularly preferably 20 μm to 40 μm.

In the pressure sensor module 15, a moisture prevention film 18 that prevents entry of the system water 21 is formed on an inner surface of the branch channel 34, an inner surface of the joining layer 32, and a back surface of the piezoresistive semiconductor element 3 so as to cover the inner surface of the branch channel 34, the inner surface of the joining layer 32, and the back surface of the piezoresistive semiconductor element 3, that is, so as to isolate the surfaces from the system water 21.

The inner surface of the branch channel 34 is a surface of the flow channel substrate 25 in the branch channel 34 (surface of the branch channel 34) on a side to be in contact with the system water 21, the inner surface of the joining layer 32 is a surface of the joining layer 32 in the branch channel 34 on a side to be in contact with the system water 21, and the back surface of the piezoresistive semiconductor element 3 is a surface of the diaphragm (surface of the semiconductor element on a side where the strain detection unit is not mounted) on a side to be in contact with the system water 21.

The moisture prevention film 18 is formed of a composite film made of an organic film material and an inorganic film material, a single-layer film or multilayer film made of only an organic film material, or a single-layer film or multilayer film made of only an inorganic film material.

An organic film material such as a moisture prevention coating agent or an inorganic film material such as a metal can be used for the moisture prevention film.

The moisture prevention film 18 formed on the inner surface of the joining layer 32 is preferably formed thicker than the moisture prevention film 18 formed on the inner surface of the branch channel 34 and the back surface of the piezoresistive semiconductor element 3.

In this way, by forming the moisture prevention film 18 so as to cover the inner surface of the branch channel 34, the inner surface of the joining layer 32, and the back surface of the piezoresistive semiconductor element 3, it is possible to protect the joining layer 32 to be in direct-contact with the system water 21 from the system water 21 (the liquid 22 in some cases) and to prevent water molecules of the system water 21 from entering the inside of the joining layer 32 or a joining interface between the joining layer 32 and the piezoresistive semiconductor element 3 or the flow channel substrate 25.

Accordingly, it is possible to prevent swelling of the joining layer 32 that joins the flow channel substrate 25 to the piezoresistive semiconductor element 3, peeling of the joining layer 32 from the flow channel substrate 25 or the piezoresistive semiconductor element 3, deterioration of the joining layer 32, and the like, to maintain a strength of the joining layer 32, and to improve reliability of the pressure sensor module 15.

Since a pressure change in the system water 21 is repeatedly measured, when the pressure sensor module 15 is used for a long period of time, the water molecules of the system water 21 enter the inside of the joining layer 32, or the joining interface between the joining layer 32 and the piezoresistive semiconductor element 3 or the flow channel substrate 25, which may cause a stress change in the material of the joining layer 32 or a decrease in a joining strength of the joining layer 32.

Therefore, the pressure sensor module 15 can be used for a long period of time by forming the moisture prevention film 18 that prevents contact with the system water 21, particularly on the inner surface of the joining layer 32 to be in contact with the system water 21.

A quadrangular prism shaped space is formed inside the flow channel substrate 25 at a position connected to the flow channel 33 and facing the branch channel 34, which is branched toward an outer surface of the flow channel substrate 25 (Z direction: lower direction in Embodiment 1), and has a rectangular cross-sectional shape in the horizontal direction (rectangle longer in the Y direction than in the X direction, whose width in the X direction is equal to or larger than a width of the branch channel 34 in the X direction).

The quadrangular prism shaped space may be a cylindrical space (referred to as a "first cylindrical space" for convenience of description). That is, the first cylindrical space is a space formed inside the flow channel substrate 25 at a position connected to the flow channel 33 and facing the branch channel 34, branched toward the outer surface of the flow channel substrate 25 (Z direction: lower direction in Embodiment 1), and having a circular cross-sectional shape in the horizontal direction. A diameter of a horizontal circle of the first cylindrical space is larger than a diameter of a horizontal circle of the branch channel 34.

Further, inside the flow channel substrate 25, a cylindrical space (referred to as a "second cylindrical space" for convenience of description) is formed in communication with the quadrangular prism shaped space or the first cylindrical space in a direction opposite to the branch channel 34 (lower direction in Embodiment 1). The second cylindrical space is a space having a circular cross-sectional shape in the horizontal direction, and a diameter of the circle is larger than a Y-direction length of the rectangle of the quadrangular prism or the diameter of the circle of the first cylindrical space.

The quadrangular prism shaped space or the first cylindrical space corresponds to a portion where the second cylindrical space (which may be referred to as a "cylindrical space" in the description of FIG. 3 and corresponds to a cylindrical space 20 or a cylindrical space 20*a* in the description from FIG. 4 onwards) communicates with the flow channel 33.

A cylindrical sealing member 19 is formed in the cylindrical space to seal between the flow channel 33 and the outside of the flow channel substrate 25, that is, to seal the cylindrical space (to close or fill the cylindrical space). The sealing member 19 is made of the same material as the flow channel substrate 25.

A screw portion 36 is formed on an inner surface of the cylindrical space (side surface of the cylindrical space), and the screw portion 36 is also formed around (on an outer surface of) the sealing member 19. The sealing member 19 is fitted to the flow channel substrate 25. That is, the screw portion 36 formed around the sealing member 19 is fitted to the screw portion 36 formed on the inner surface of the cylindrical space.

A seal portion 17 that seals between the sealing member 19 and the flow channel substrate 25 is formed around the sealing member 19. Here, the seal portion 17 is a seal tape that is formed on the screw portion 36 formed around the sealing member 19 and is made of a polytetrafluoroethylene material. Another seal material or adhesive is used for the seal portion 17.

In this way, a gap around the sealing member 19, that is, between the inner surface of the cylindrical space and a periphery of the sealing member 19 is sealed by the screw portions 36 and the seal portion 17. Accordingly, leakage of the system water 21 can be prevented.

In the piezoresistive semiconductor element 3, the diaphragm is bent (strained) and deformed by the pressure change in the system water 21 flowing through the flow channel 33. Then, a change in a resistance value due to bending (strain) deformation of the diaphragm is electrically measured, the change in the resistance value is converted into a change in a pressure value, and a pressure of the system water 21 flowing through the flow channel 33 is measured.

That is, a strain detection unit that detects the pressure change is formed (adhered) in the piezoresistive semiconductor element 3, for example, on the diaphragm made of a silicon material, and the diaphragm is deformed by the pressure change in the system water 21 flowing through the flow channel 33. Then, the piezoresistive semiconductor element 3 electrically measures a change amount of the diaphragm as the change in the resistance value using, for example, a Wheatstone bridge circuit, converts the change in the resistance value into the change in the pressure value, and measures the pressure of the system water 21 flowing through the flow channel 33.

For example, a thickness of the diaphragm is preferably 10 μm to 50 μm, particularly preferably 10 μm to 30 μm. By reducing the thickness of the diaphragm, a deformation area (deformation range) can be increased with respect to a minute pressure change in the system water 21, and measurement accuracy of the pressure of the system water 21 can be improved.

Etching, grinding, or the like can be used for a process of thinning the diaphragm.

It is preferable to form a thin film insulator on a surface of the thinned diaphragm. Accordingly, even when the thickness of the diaphragm is reduced by the process of thinning the diaphragm, electrical leakage caused by a structure of the piezoresistive semiconductor element 3 or electrical conductivity of the diaphragm can be prevented.

It is preferable to form a thin metal film on a surface of the piezoresistive semiconductor element 3 and/or a surface of the flow channel substrate 25. Accordingly, adhesion between the adhesive material used for the joining layer 32 and the piezoresistive semiconductor element 3 or the flow channel substrate 25 can be improved.

Next, a manufacturing process for forming the moisture prevention film 18 of the pressure sensor module 15 according to Embodiment 1 will be described.

FIG. 4 shows cross-sectional views showing steps (a), (b), and (c) of the manufacturing process for forming the moisture prevention film 18 of the pressure sensor module 15 according to Embodiment 1. A left-right direction of the cross-sectional views indicates the Y direction (long side direction), and an upper-lower direction of the cross-sectional views indicates the Z direction (height direction).

As shown in (a) of FIG. 4, first, the flow channel substrate 25 is processed. The cylindrical flow channel 33 is formed in the flow channel substrate 25 in the Y direction (horizontal direction). Thereafter, the cylindrical branch channel 34 is formed in the flow channel substrate 25 in the vertical direction above the flow channel 33 so as to be connected to the flow channel 33 from an upper surface side in the Z direction. Thereafter, the cylindrical space (opening) 20 is formed in the flow channel substrate 25 in the vertical direction below the flow channel 33 so as to be connected to the flow channel 33 from a lower surface side in the Z direction. That is, the cylindrical space 20 is formed in a direction opposite to a formation direction of the branch channel 34.

Here, a diameter X3 of the cylindrical space 20 is formed to be larger than a portion where the cylindrical space 20 communicates with the flow channel 33 (a Y-direction length of a rectangle of a quadrangular prism or a diameter of a circle of a first cylindrical space). That is, a protruding portion 26 protruding to the inside of the cylindrical space 20 is formed in a part of the portion where the cylindrical space 20 communicates with the flow channel 33. In this way, the diameter X3 of the cylindrical space 20 is larger than a width dimension X2 corresponding to the protruding portion 26.

The portion where the cylindrical space 20 communicates with the flow channel 33, that is, the width dimension X2 corresponding to the protruding portion 26 is formed to be larger than a diameter X1 of the branch channel 34.

Accordingly, when forming the moisture prevention film 18, there is no part that becomes a shadow, and the moisture prevention film 18 can be easily formed.

Next, the screw portion 36 is formed on the inner surface of the cylindrical space 20.

Then, the piezoresistive semiconductor element 3 is joined to the flow channel substrate 25 via the joining layer 32 so as to close the branch channel 34.

As shown in (b) of FIG. 4, the moisture prevention film 18 is formed from a direction of an arrow 35 through the cylindrical space 20. By forming the moisture prevention film 18 from the direction of the arrow 35, the moisture prevention film 18 can be formed so as to cover an inner surface of the branch channel 34, an inner surface of the joining layer 32, and a back surface of the piezoresistive semiconductor element 3.

For example, the moisture prevention film 18 is formed by spray coating an organic film material such as a moisture prevention coating agent. By spray coating, the moisture prevention film 18 can be uniformly formed. A thickness of the moisture prevention film 18 is preferably 10 μm to 30 μm so as not to inhibit a function of the diaphragm.

In particular, the moisture prevention coating agent tends to remain thick at corner portions due to influence of surface tension. Therefore, by using the moisture prevention coating agent for the moisture prevention film 18, the moisture prevention film 18 formed on the inner surface of the joining layer 32, that is, the moisture prevention film 18 formed on the corner portions (around the joining layer 32) can be formed to be thicker by about 5 μm to 10 μm than the moisture prevention film 18 formed on the inner surface of the branch channel 34 and the back surface of the piezoresistive semiconductor element 3.

Accordingly, it is possible to prevent water molecules of the system water 21 from entering the inside of the joining layer 32 or a joining interface between the joining layer 32 and the piezoresistive semiconductor element 3 or the flow channel substrate 25.

As shown in (c) of FIG. 4, the cylindrical sealing member 19 is installed in the cylindrical space 20. Accordingly, the pressure sensor module 15 is completed.

In this way, in Embodiment 1, the cylindrical space 20 is formed in the flow channel substrate 25 from the lower surface side (a surface side opposite to a surface on which the piezoresistive semiconductor element 3 is installed). Then, the moisture prevention film 18 is formed via the cylindrical space 20. Thereafter, the cylindrical space 20 is closed by the sealing member 19. Accordingly, the moisture prevention film 18 can be easily formed.

Modification 1

Next, a manufacturing process for forming the moisture prevention film 18 (inorganic film material) of the pressure sensor module 15 according to Embodiment 1 will be described.

FIG. 5 shows cross-sectional views showing steps (a) and (b) of the manufacturing process for forming the moisture prevention film 18 (inorganic film material) of the pressure sensor module 15 according to Embodiment 1. A left-right direction of the cross-sectional views indicates the Y direction (long side direction), and an upper-lower direction of the cross-sectional views indicates the Z direction (height direction).

As shown in (a) of FIG. 5, a moisture prevention film **18*b* made of an inorganic film material is formed from the direction of the arrow 35 through the cylindrical space 20**.

The inorganic film material is a metal or the like, and is formed using a sputtering device. When forming the moisture prevention film **18*b* using the sputtering device, the moisture prevention uniform film thickness can be formed so as to cover an inner surface of the branch channel 34, an inner surface of the joining layer 32, and a back surface of the piezoresistive semiconductor element 3**.

The inorganic film material is preferably the same material as a diaphragm (for example, silicon). By using the same material as the diaphragm as the inorganic film material, the diaphragm and the moisture prevention film **18*b* have the same Young's modulus, and a function of the diaphragm can be maintained. Peeling of the moisture prevention film 18 from the diaphragm due to repeated stress can also be prevented. In consideration of the film thickness of the moisture prevention film 18*b* in advance, it is preferable to form the diaphragm as thin as the thickness of the moisture prevention film 18*b***.

Silicon nitride can also be used as the inorganic film material. When using silicon nitride, since silicon nitride has a large Young's modulus, the film thickness of the moisture prevention film **18*b*** is preferably 200 nm to 800 nm. Aluminum having a moisture prevention effect can also be used as the inorganic film material. Other materials can be used as long as the material has a moisture prevention effect.

The inner surface of the branch channel 34 is formed such that the film thickness of the moisture prevention film **18*b*, which is a sputtered film, is thinner than that of the inner surface of the joining layer 32 and the back surface of the piezoresistive semiconductor element 3 due to influence of a solid angle. However, since the moisture prevention film 18*b* is sufficiently formed around the joining layer 32, the moisture prevention film 18*b* can prevent water molecules of the system water 21 from entering the inside of the joining layer 32 or a joining interface between the joining layer 32 and the piezoresistive semiconductor element 3 or the flow channel substrate 25**.

The moisture prevention film **18*b*** is not limited to be formed by the sputtering device, and any device that can form an inorganic film material may be used, for example, a vapor deposition device, or an electron beam sputtering device.

Although the moisture prevention film **18*b* is also formed on a part of the flow channel 33 around the branch channel 34 and a part of the protruding portion 26, there is no problem in a function of the flow channel substrate 25**.

A mask 38 is formed on a surface of a lower outer surface of the flow channel substrate 25, and the mask 38 is removed after the moisture prevention film **18*b* is formed. Therefore, the moisture prevention film 18*b* is not formed on the surface of the lower outer surface of the flow channel substrate 25**.

As shown in (b) of FIG. 5, a cylindrical sealing member **19*a* (without a screw portion) is installed in the cylindrical space 20*a* (without a screw portion). Then, a periphery of the sealing member 19*a* (between the sealing member 19*a* and the flow channel substrate 25) is sealed using an adhesive 17***a*. Accordingly, the pressure sensor module 15 is completed.

A gap between an inner surface of the cylindrical space 20*a* and the periphery of the sealing member 19*a* is preferably 100 μm to 200 μm. Accordingly, the adhesive 17*a* can be appropriately inserted into the gap, and leakage of the system water 21 can be appropriately prevented. A silicon-based adhesive, an epoxy-based adhesive, or the like can be used as the adhesive 17*a*.

Modification 2

Next, another pressure sensor module 15 according to Embodiment 1 will be described.

FIG. 6A is a cross-sectional view showing the other pressure sensor module 15 according to Embodiment 1.

In the pressure sensor module 15 shown in FIG. 3B, (c) of FIG. 4, or (b) of FIG. 5, a stepped portion is formed in a part of a portion where the cylindrical space 20 or the cylindrical space 20*a* communicates with the flow channel 33.

Therefore, as shown in FIG. 6A, it is preferable to install a sealing member 19*b* in which the stepped portion is not formed. Accordingly, leakage of the system water 21 can be prevented, and generation of bubbles due to contact of the system water 21 with the stepped portion can be prevented.

The sealing member 19*b* has, on the cylindrical sealing member 19, a protrusion 29 that corresponds to (is fitted into) a quadrangular prism shaped space or a first cylindrical space and fills the quadrangular prism shaped space or the first cylindrical space.

When the protrusion 29 of the sealing member 19*b* has a quadrangular prism shape, a width in the X direction is a width of the quadrangular prism shaped space in the X direction, a width in the Y direction is a width of the quadrangular prism shaped space in the X direction (width dimension X2 corresponding to the protruding portion 26), and a height in the Z direction is a height of the quadrangular prism shaped space in the Z direction.

When the protrusion 29 of the sealing member 19*b* has a cylindrical shape, a diameter is a diameter of the first cylindrical space, and a height in the Z direction is a height of the first cylindrical space in the Z direction.

Next, the sealing member 19*b* of another pressure sensor module 15 according to Embodiment 1 will be described.

FIG. 6B is a perspective view showing the sealing member 19*b* of the other pressure sensor module 15 according to Embodiment 1.

Portions of the sealing member 19*b* other than the protrusion 29 are the same as those of the sealing member 19. The protrusion 29 of the sealing member 19*b* has a lower end formed in a planar shape and an upper end formed in a round shape 39. The round shape 39 is formed in a concave shape with a curvature equal to that of the cylindrical flow channel 33. The protrusion 29 of the sealing member 19*b* is installed such that the round shape 39 is in the same direction (Y direction) as the flow channel 33. Accordingly, the stepped portion formed in the portion where the cylindrical space 20 or the cylindrical space 20*a* communicates with the flow channel 33 can be eliminated.

Modification 3

Next, a composite film as the moisture prevention film 18 of the pressure sensor module 15 according to Embodiment 1 will be described.

FIG. 7 is an enlarged cross-sectional view showing the composite film as the moisture prevention film 18 of the pressure sensor module 15 according to Embodiment 1.

At the outlet portion of the branch channel 34, the piezoresistive semiconductor element 3 is joined to the flow channel substrate 25 via the joining layer 32 so as to close the branch channel 34. Then, the moisture prevention film 18 is formed so as to cover the inner surface of the branch channel 34, the inner surface of the joining layer 32, and the back surface of the piezoresistive semiconductor element 3. The moisture prevention film 18 can be formed as the composite film or a multilayer film.

In particular, in order to prevent the water molecules of the system water 21 from entering the inner surface of the joining layer 32 that joins the piezoresistive semiconductor element 3 to the flow channel substrate 25 and the joining interface between the joining layer 32 and the piezoresistive semiconductor element 3 or the flow channel substrate 25, that is, in order to prevent the water molecules of the system water 21 from entering the inner surface of the joining layer 32 and the joining interface of the joining layer 32, the moisture prevention film 18 that does not allow the system water 21 to pass through is formed.

Therefore, a first moisture prevention film 18*c* is formed so as to cover the inner surface of the joining layer 32 and the joining interface of the joining layer 32, and a second moisture prevention film 18*d* is formed so as to cover a surface of the first moisture prevention film 18*c* (surface in contact with the system water 21), the inner surface of the branch channel 34, and the back surface of the piezoresistive semiconductor element 3.

The first moisture prevention film 18*c* and the second moisture prevention film 18*d* are formed of a composite film made of an organic film material and an inorganic film material, a single-layer film or a multilayer film made of only an organic film material, or a single-layer film or a multilayer film made of only an inorganic film material.

Here, the first moisture prevention film 18*c* is formed so as to cover the inner surface of the joining layer 32 and the joining interface of the joining layer 32. The first moisture prevention film 18*c* may be formed so as to cover the inner surface of the branch channel 34, the inner surface of the joining layer 32, and the back surface of the piezoresistive semiconductor element 3, and the second moisture prevention film 18*d* may be formed on the entire surface of the first moisture prevention film 18*c*.

The moisture prevention film 18 (the second moisture prevention film 18*d*, or the first moisture prevention film 18*c* and the second moisture prevention film 18*d*) formed so as to cover r the back surface of the piezoresistive semiconductor element 3 is preferably formed to be thin (for example, 3 μm to 9 μm) so as not to inhibit the function of the diaphragm. Therefore, a thick polytetrafluoroethylene sheet of about several 100 μm cannot be used for the moisture prevention film 18 (the second moisture prevention film 18*d*, or the first moisture prevention film 18*c* and the second moisture prevention film 18*d*).

Modification 4

Next, the pressure sensor module 15 including a flexible substrate 41 according to Embodiment 1 will be described.

FIG. 8 is a perspective view showing the pressure sensor module 15 including the flexible substrate 41 according to Embodiment 1.

The pressure sensor module 15 has electrical wiring connected to the piezoresistive semiconductor element 3.

Electrode pads 42*b* are formed at a plurality of positions on the piezoresistive semiconductor element 3, and electrode pads 42*a* are also formed at a plurality of positions on the flexible substrate 41 for the electrical wiring. The electrode pad 42*a* and the electrode pad 42*b* are connected by a wire 43.

A gold wire or an aluminum wire is used as the wire 43. An anisotropic conductive film (ACF) or the like may be used to connect the electrode pad 42*a* and the electrode pad 42*b*.

The system water 21 flows through the flow channel 33 and flows into the branch channel 34. Then, a pressure is applied to the piezoresistive semiconductor element 3 due to a pressure change in the system water 21 that flowed into the branch channel 34. The piezoresistive semiconductor element 3 is deformed when the pressure is applied. Then, the flexible substrate 41 detects deformation of the piezoresistive semiconductor element 3 as an electrical signal, and measures the pressure of the system water 21 flowing through the flow channel 33.

In this way, according to Embodiment 1, it is possible to provide the highly reliable pressure sensor module 15 that maintains a strength of the joining layer 32 that joins the flow channel substrate 25 to the piezoresistive semiconductor element 3.

According to Embodiment 1, since the pressure sensor module 15 has a simple structure with a small number of components, the pressure sensor module 15 can be easily downsized, and since the pressure sensor module 15 is small-sized, the pressure sensor module 15 can be installed in the vicinity of the nozzle 2, for example, inside the dispensing arm 16.

Since the pressure sensor module 15 can be installed in the vicinity of the nozzle 2, it is possible to provide the highly accurate dispensing device 1 that can measure a minute pressure change in aspiration or ejection of the liquid 22, is highly reliable, estimates a dispensing amount with high accuracy, and detects a dispensing abnormality with high accuracy.

According to Embodiment 1, since the piezoresistive semiconductor element 3 can be directly installed at the outlet portion of the branch channel 34, a distance between the flow channel 33 and the piezoresistive semiconductor element 3 is as short as 3 mm to 5 mm, and the pressure change in the system water 21 flowing through the flow channel 33 can be detected with high accuracy and at high speed.

Embodiment 2

Next, a manufacturing process of the pressure sensor module 15 according to Embodiment 2 will be described.

FIG. 9 shows cross-sectional views showing steps (a), (b), (c), and (d) of the manufacturing process of the pressure sensor module 15 according to Embodiment 2. A left-right direction of the cross-sectional views indicates the Y direction (long side direction), and an upper-lower direction of the cross-sectional views indicates the Z direction (height direction).

In Embodiment 1, the moisture prevention film 18 is formed from the lower surface side of the flow channel substrate 25 via the cylindrical space 20 formed below the flow channel 33. On the other hand, in Embodiment 2, a part of the flow channel substrate 25 (the flow channel substrate 25 in a periphery where the piezoresistive semiconductor element 3 is installed) is partially formed to form the moisture prevention film 18.

As shown in (a) of FIG. 9, a donut-shaped (ring-shaped) flow channel substrate 25*a* (first flow channel substrate) is formed as a member above the flow channel 33. That is, the cylindrical flow channel substrate 25*a* is formed in which the cylindrical branch channel 34 penetrating the flow channel substrate 25*a* is formed in a center. Then, the screw portion 36 is formed on an outer peripheral portion of the flow channel substrate 25*a*.

Next, the piezoresistive semiconductor element 3 is joined to a front surface side of the flow channel substrate 25*a* via the joining layer 32 so as to close the branch channel 34.

As shown in (b) of FIG. 9, the moisture prevention film 18 is formed from a back surface side of the flow channel substrate 25*a*. The moisture prevention film 18 is formed by spray coating or sputtering. A single-layer film or a composite film made of an organic film or an inorganic film, or a composite film made of an organic film and an inorganic film is used for the moisture prevention film 18.

That is, in the flow channel substrate 25*a*, the branch channel 34 connected to the flow channel 33 is formed, the semiconductor element on which a strain detection unit is mounted is joined to an outlet portion of the branch channel 34 via the joining layer 32 so as to close the outlet portion of the branch channel 34, and the moisture prevention film 18 is formed so as to cover a surface of the branch channel 34, a surface of the joining layer 32, and a surface of the semiconductor element on a side where the strain detection unit is not mounted.

As shown in (c) of FIG. 9, a flow channel substrate 25*b* (second flow channel substrate) is formed. The flow channel 33 is formed inside the flow channel substrate 25*b*, and a cylindrical space (opening) into which the flow channel substrate 25*a* is fitted is formed above the flow channel 33. The screw portion 36 that is fitted to the screw portion 36 formed at an outer peripheral portion of the flow channel substrate 25*a* is formed at an inner peripheral portion of the cylindrical space.

A length of the flow channel substrate 25*a* in the height direction is smaller than a length of the flow channel substrate 25*b* in the height direction above the flow channel 33. The length of the flow channel substrate 25*a* in the height direction is equal to a length of the cylindrical space in the height direction. Therefore, a cylindrical space connecting the flow channel 33 and the branch channel 34 formed in the flow channel substrate 25*a* is formed in the flow channel substrate 25*b* above the flow channel 33. A diameter of the cylindrical space is equal to a diameter of the branch channel 34. That is, the protruding portion 26 is formed in the flow channel substrate 25*b* above the flow channel 33. A diameter of the flow channel substrate 25*a* is equal to a diameter of the cylindrical space 20.

As shown in (d) of FIG. 9, the flow channel substrate 25*a* (component) is inserted into a body of the flow channel substrate 25*b*, and the screw portion 36 is sealed by a seal tape or an adhesive (seal portion 17). Accordingly, the pressure sensor module 15 is completed.

In this way, according to Embodiment 2, the flow channel substrate 25*a* on which the piezoresistive semiconductor element 3 is installed can be handled as a component, and the moisture prevention film 18 can be formed in parallel at a time on a plurality of (a large number of) components, which is excellent in productivity (mass productivity).

According to Embodiment 2, since the cylindrical space 20 is not formed below the flow channel 33, no stepped portion is formed, and generation of bubbles due to contact of the system water 21 with the stepped portion can be prevented.

According to Embodiment 2, it is possible to provide the highly reliable pressure sensor module 15 that maintains a strength of the joining layer 32 that joins the flow channel substrate 25 to the piezoresistive semiconductor element 3.

Embodiment 3

Next, a manufacturing process of the pressure sensor module 15 according to Embodiment 3 will be described.

FIG. 10 shows cross-sectional views showing steps (a), (b), and (c) of the manufacturing process of the pressure sensor module 15 according to Embodiment 3. A left-right direction of the cross-sectional views indicates the Y direction (long side direction), and an upper-lower direction of the cross-sectional views indicates the Z direction (height direction).

In Embodiment 1, the flow channel 33 is formed in the flow channel substrate 25, the cylindrical branch channel 34 and the cylindrical space 20 are formed after the flow channel 33 is formed, the moisture prevention film 18 is formed from the lower surface side of the flow channel substrate 25 via the cylindrical space 20, and then the sealing member 19 is formed. On the other hand, in Embodiment 3, the cylindrical branch channel 34 and the cylindrical space 20 are formed in the flow channel substrate 25 before the flow channel 33 is formed, then the moisture prevention film 18 is formed from a lower surface side of the flow channel substrate 25 via the cylindrical space 20, then the sealing member 19 is formed, and finally the flow channel 33 is formed.

As shown in (a) of FIG. 10, the cylindrical branch channel 34 and the cylindrical space 20 are formed in the vicinity of a central portion of the flow channel substrate 25*c* so as to penetrate the flow channel substrate 25*c* in a vertical direction from a back surface side of the flow channel substrate 25*c*. The cylindrical branch channel 34 and the cylindrical space 20 are formed in two stages (a diameter of the cylindrical branch channel 34 is smaller than a diameter of the cylindrical space 20) so as to have a protruding cross-sectional shape in the vertical direction. The screw portion 36 is formed at an inner peripheral portion of the cylindrical space 20.

Next, the piezoresistive semiconductor element 3 is joined to a front surface side of the flow channel substrate 25*c* via the joining layer 32 so as to close the branch channel 34.

Then, the moisture prevention film 18 is formed from the back surface side of the flow channel substrate 25*c*. The moisture prevention film 18 is formed by spray coating or sputtering. A single-layer film or a composite film made of an organic film or an inorganic film, or a composite film made of an organic film and an inorganic film is used for the moisture prevention film 18.

As shown in (b) of FIG. 10, a two-stage cylindrical sealing member 19*c* having a protruding cross-sectional shape in the vertical direction is inserted from the back surface side of the flow channel substrate 25*c*.

A diameter of a first stage (lower stage) of the two-stage cylindrical sealing member 19*c* is equal to a diameter of a first stage (lower stage) of the cylindrical space 20, and a diameter of a second stage (upper stage) of the two-stage cylindrical sealing member 19*c* is equal to a diameter of a second stage (upper stage) of the cylindrical space 20.

A length of the first stage (lower stage) of the two-stage cylindrical sealing member 19*c* in the height direction is equal to a length of the first stage (lower stage) of the cylindrical space 20 in the height direction, and a length of the second stage (upper stage) of the two-stage cylindrical sealing member 19*c* in the height direction is smaller than a length of the second stage (upper stage) of the cylindrical space 20 in the height direction.

The screw portion 36 that is fitted to the screw portion 36 formed at the inner peripheral portion of the cylindrical space 20 is formed at an outer peripheral side of the first stage (lower stage) of the two-stage cylindrical sealing member 19*c*.

Then, the screw portion 36 (a periphery of the first stage (lower stage) of the two-stage cylindrical sealing member 19*c*, that is, a gap between an inner surface of the first stage (lower stage) of the cylindrical space 20 and an outer surface of the first stage (lower stage) of the cylindrical sealing member 19*c*) is sealed by a seal tape or an adhesive (seal portion 17*a*), and a periphery of the second stage (upper stage) of the two-stage cylindrical sealing member 19*c*, that is, a gap between an inner surface of the second stage (upper stage) of the cylindrical space 20 and an outer surface of the second stage (upper stage) of the cylindrical sealing member 19*c* is sealed by a seal tape or an adhesive (seal portion 17*b*).

As shown in (c) of FIG. 10, the cylindrical flow channel 33 is formed in the Y direction from a side surface side of the flow channel substrate 25. The flow channel 33 is formed to be connected to the branch channel 34. Accordingly, the pressure sensor module 15 is completed. In this way, since the flow channel 33 is formed last, the pressure sensor module 15 having the flow channel 33 of various diameters can be manufactured.

When forming the flow channel 33, a part of the sealing member 19*c* and the seal portion 17*b* is cut simultaneously with formation of the flow channel 33.

A screw portion (not shown) connected to the pipe 8 is formed at each of the flow channel inlet 33*a* and the flow channel outlet 33*b* of the flow channel 33.

In this way, according to Embodiment 3, since a part of the sealing member 19*c* and the seal portion 17*b* is cut simultaneously with the formation of the flow channel 33, no stepped portion is formed in a portion (joint) where the cylindrical space 20 communicates with the flow channel 33, and generation of bubbles due to contact of the system water 21 with the stepped portion can be prevented.

According to Embodiment 3, it is possible to provide the highly reliable pressure sensor module 15 that maintains a strength of the joining layer 32 that joins the flow channel substrate 25 to the piezoresistive semiconductor element 3.

Embodiment 4

Next, a manufacturing process of the pressure sensor module 15 according to Embodiment 4 will be described.

FIG. 11 shows cross-sectional views showing steps (a), (b), and (c) of the manufacturing process of the pressure sensor module 15 according to Embodiment 4. A left-right direction of the cross-sectional views indicates the Y direction (long side direction), and an upper-lower direction of the cross-sectional views indicates the Z direction (height direction).

Embodiment 4 has characteristics of Embodiment 2 and Embodiment 3, in which a part of the flow channel substrate 25 is partially formed to form the moisture prevention film 18, the cylindrical branch channel 34 is formed in the flow channel substrate 25 before the flow channel 33 is formed, the moisture prevention film 18 is formed, a part of the partially formed flow channel substrate 25 is inserted into a body of the flow channel substrate 25, and finally the flow channel 33 is formed.

As shown in (a) of FIG. 11, a flow channel substrate 25*e* is formed. In the flow channel substrate 25*e*, a cylindrical space 20*b* is formed in the vicinity of a central portion of the flow channel substrate 25*e* so as not to penetrate the flow channel substrate 25*e* from a front surface side of the flow channel substrate 25*e*. The screw portion 36 is formed at an inner peripheral portion of the cylindrical space 20*b*.

As shown in (b) of FIG. 11, a donut-shaped (ring-shaped) flow channel substrate 25*d* is formed. That is, the cylindrical flow channel substrate 25*d* (first flow channel substrate) in which the cylindrical branch channel 34 is formed in a center is formed.

That is, the cylindrical flow channel substrate 25*d* is formed in which the cylindrical branch channel 34 penetrating the flow channel substrate 25*d* is formed in a center. Then, the screw portion 36 that is fitted to the screw portion 36 formed at an inner peripheral portion of the cylindrical space 20*b* is formed at an outer peripheral portion of the flow channel substrate 25*d*.

A length of the flow channel substrate 25*d* in the height direction is equal to a length of the cylindrical space 20*b* in the height direction. A diameter of the flow channel substrate 25*d* is equal to a diameter of the cylindrical space 20*b*.

Next, the piezoresistive semiconductor element 3 is joined to a front surface side of the flow channel substrate 25*a* via the joining layer 32 so as to close the branch channel 34.

Next, the moisture prevention film 18 is formed from a back surface side of the flow channel substrate 25*d*. The moisture prevention film 18 is formed by spray coating or sputtering. A single-layer film or a composite film made of an organic film or an inorganic film, or a composite film made of an organic film and an inorganic film is used for the moisture prevention film 18.

Then, the flow channel substrate 25*d* is inserted into the flow channel substrate 25*e* (second flow channel substrate). That is, the screw portion 36 formed at the outer peripheral portion of the flow channel substrate 25*d* is fitted to the screw portion 36 formed at the inner peripheral portion of the cylindrical space 20*b*. The screw portion 36 is sealed by a seal tape or an adhesive (seal portion 17).

As shown in (c) of FIG. 11, the cylindrical flow channel 33 is formed in the Y direction from a side surface side of the flow channel substrate 25. The flow channel 33 is formed to be connected to the branch channel 34. Accordingly, the pressure sensor module 15 is completed. In this way, since the flow channel 33 is formed last, the pressure sensor module 15 having the flow channel 33 of various diameters can be manufactured.

A screw portion (not shown) connected to the pipe 8 is formed at each of the flow channel inlet 33*a* and the flow channel outlet 33*b* of the flow channel 33.

In this way, according to Embodiment 4, since the cylindrical space 20 is not formed below the flow channel 33, and the flow channel 33 is formed last, no stepped portion is formed, and generation of bubbles due to contact of the system water 21 with the stepped portion can be prevented.

According to Embodiment 4, the flow channel substrate 25*d* on which the piezoresistive semiconductor element 3 is installed can be handled as a component, and the moisture prevention film 18 can be formed in parallel at a time on a plurality of (a large number of) components, which is excellent in productivity (mass productivity).

According to Embodiment 4, it is possible to provide the highly reliable pressure sensor module 15 that maintains a strength of the joining layer 32 that joins the flow channel substrate 25 to the piezoresistive semiconductor element 3.

The invention is not limited to the embodiments described above, and includes various modifications. For example, the embodiments described above have been specifically described to facilitate understanding of the invention, and the invention is not necessarily limited to those having all the configurations described above.

A part of a configuration of one embodiment may be replaced with a part of a configuration of another embodiment. A configuration of another embodiment may be added to a configuration of one embodiment. A part of a configuration of each embodiment may be deleted, added with a part of another configuration, or replaced with a part of another configuration.

REFERENCE SIGNS LIST

1: dispensing device
2: nozzle
3: piezoresistive semiconductor element
4: syringe pump
5: solenoid valve
6: gear pump
7: tank
8: pipe
9: container
10: plunger
11: ball screw
12: motor
13: dispensing mechanism
14: control board
15: pressure sensor module
16: dispensing arm
17: seal portion
18: moisture prevention film
19: sealing member
20: space
21: system water
22: liquid
23: dividing air
25: flow channel substrate
26: protruding portion
29: protrusion
32: joining layer
33: flow channel
34: branch channel
35: arrow
36: screw portion
38: mask
39: round shape
41: flexible substrate
42: electrode pad
43: wire

The invention claimed is:

1. A pressure sensor module comprising:
inside a flow channel substrate,
a flow channel configured to allow system water to flow therethrough; and
a cylindrical branch channel connected to the flow channel, wherein
a semiconductor element on which a strain detection unit is mounted is joined to the flow channel substrate via a joining layer at an outlet portion of the branch channel so as to close the outlet portion of the branch channel, and a moisture prevention film is provided so as to cover a surface of the flow channel substrate in the branch channel, a surface of the joining layer in the branch channel, and a surface of the semiconductor element on a side where the strain detection unit is not mounted.

2. The pressure sensor module according to claim 1, wherein a cylindrical opening connected to the flow channel is formed in a direction opposite to a formation direction of the branch channel, the moisture prevention film is formed through the opening, and a sealing member that seals the opening is formed.

3. The pressure sensor module according to claim 1, wherein the moisture prevention film is a composite film made of an organic film material and an inorganic film material, a film made of an organic film material, or a film made of an inorganic film material.

4. The pressure sensor module according to claim 2, wherein a screw portion and/or a seal portion that seals between the sealing member and the flow channel substrate are provided around the sealing member.

5. The pressure sensor module according to claim 2, wherein a diameter of the opening is larger than a portion where the opening communicates with the flow channel.

6. The pressure sensor module according to claim 2, wherein a portion where the opening communicates with the flow channel is formed to be larger than a diameter of the branch channel.

7. The pressure sensor module according to claim 2, wherein the sealing member includes a protrusion that fills a portion where the opening communicates with the flow channel.

8. A pressure sensor module, wherein a cylindrical branch channel connected to a flow channel configured to allow system water to flow therethrough is formed, a semiconductor element on which a strain detection unit is mounted is mounted to an outlet portion of the branch channel via a joining layer so as to close the outlet portion of the branch channel, and a first flow channel substrate on which a moisture prevention film is formed is fitted into a second flow channel substrate in which the flow channel is formed, the moisture prevention film being formed to cover a surface of the branch channel, a surface of the joining layer, and a surface of the semiconductor element on a side where the strain detection unit is not mounted.

9. A dispensing device comprising:

the pressure sensor module according to claim 1.

* * * * *